United States Patent
Sakamoto

(10) Patent No.: US 8,422,520 B2
(45) Date of Patent: Apr. 16, 2013

(54) LASER LIGHT EMITTING DEVICE AND METHOD OF MANUFACTURING THE SAME, AND FIBER LASER APPARATUS USING THE SAME

(75) Inventor: Shinichi Sakamoto, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/453,166

(22) Filed: Apr. 23, 2012

(65) Prior Publication Data

US 2012/0257644 A1    Oct. 11, 2012

Related U.S. Application Data

(63) Continuation of application No. PCT/JP2010/068024, filed on Oct. 14, 2010.

(30) Foreign Application Priority Data

Oct. 23, 2009   (JP) ................. 2009-244810

(51) Int. Cl.
   *H01S 3/30*   (2006.01)
   *H01S 3/08*   (2006.01)

(52) U.S. Cl.
   USPC .............................................. 372/6; 372/108

(58) Field of Classification Search ............... 372/6, 108
   See application file for complete search history.

(56) References Cited

U.S. PATENT DOCUMENTS

| 5,930,421 A * | 7/1999 | Sakano ..................... 385/38 |
| 6,324,326 B1 * | 11/2001 | Dejneka et al. ............... 385/123 |
| 7,190,511 B2 | 3/2007 | Galvanauskas et al. |

FOREIGN PATENT DOCUMENTS

| JP | 9-269433 A | 10/1997 |
| JP | 10-133039 | * 5/1998 |
| JP | 10-133039 A | 5/1998 |
| JP | 2002-372636 A | 12/2002 |
| JP | 2005-017702 A | 1/2005 |

OTHER PUBLICATIONS

International Search Report of PCT/JP2010/068024, mailing date Nov. 16, 2010.

* cited by examiner

*Primary Examiner* — Armando Rodriguez
(74) *Attorney, Agent, or Firm* — Westerman, Hattori, Daniels & Adrian, LLP

(57) ABSTRACT

The laser light emitting device includes a glass rod having an input end and an output end. The glass rod has a core provided along the central axis thereof and a cladding covering the core. The refractive index of the core on the side of the input end is higher than the refractive index of the cladding. A value given through subtraction of the refractive index of the cladding from the refractive index of the core on the side of the output end is smaller than a value given through subtraction of the refractive index of the cladding from the refractive index of the core on the side of the input end.

11 Claims, 5 Drawing Sheets

LASER LIGHT EMITTING DEVICE AND METHOD OF MANUFACTURING THE SAME, AND FIBER LASER APPARATUS USING THE SAME

TECHNICAL FIELD

The present invention relates to a fiber laser light emitting device and a method of manufacturing the device, and a fiber laser apparatus using the device.

BACKGROUND ART

A fiber laser apparatus is known as one of laser apparatuses. The fiber laser apparatus includes an amplifier optical fiber doped with a rare earth element. Laser light is amplified by this amplifier optical fiber, such that the amplified laser light is output from an end of the amplifier optical fiber.

In such a fiber laser apparatus, the power intensity of laser light is high at the end of the amplifier optical fiber. For this reason, damage may be caused at the end of the amplifier optical fiber. To prevent such damage, a fiber laser apparatus is known which is configured to output laser light with power intensity reduced at the output end. The following Patent Document 1 describes such a fiber laser apparatus. In the fiber laser apparatus described in Patent Document 1, a first endface of a glass rod is connected by fusing to an endface of an amplifier optical fiber, the diameter of the glass rod being larger than the diameter of the core of the amplifier optical fiber. The laser light amplified by the amplifier optical fiber is input to the glass rod from the amplifier optical fiber. The diameter of the laser light that has been input to the glass rod is spread in the glass rod according to the numerical aperture of the optical fiber, and the laser light is output from a second endface of the glass rod. Thus, spreading the diameter of laser light allows for reduction in power intensity of laser light at the output end of the glass rod (Patent Document 1).

CITATION LIST

Patent Document

Patent Document 1: U.S. Pat. No. 7,190,511

SUMMARY OF INVENTION

Objects to be Achieved by the Invention

As described above, in the fiber laser apparatus of Patent Document 1, an endface of the amplifier optical fiber is connected by fusing to an endface of the glass rod. However, the endface onto which the glass rod of the amplifier optical fiber is to be fused may not be formed in a direction perpendicular to the direction along the axis of the amplifier optical fiber. If the glass rod is fused to such an amplifier optical fiber, it is not easy to fuse the glass rod with the amplifier optical fiber with the axial direction of the glass rod and the axial direction of the amplifier optical fiber linearly aligned. In such a case, the amplifier optical fiber and the glass rod may be fused to each other with the axial direction of the glass rod being at an angle relative to the axial direction of the amplifier optical fiber. The axial direction of the glass rod being at an angle relative to the axial direction of the amplifier optical fiber hinders laser light to be input from the amplifier optical fiber into the glass rod from traveling along the axis of the glass rod within the glass rod. Hence, a portion of laser light may reach a side surface of the glass rod before the diameter of the laser light spreads sufficiently, which may cause scattering of a portion of the laser light at the side surface of the glass rod. As a result, laser light in a desired output shape may not be obtained.

It is therefore an object of the present invention to provide a laser light emitting device enabling achievement of a fiber laser apparatus configured to output laser light in a desired output shape, a method of manufacturing the device, and a fiber laser apparatus using the device.

Means for Achieving the Objects

A laser light emitting device of the present invention includes: a glass rod including an input end and an output end, the glass rod having a core provided along a central axis thereof and a cladding covering the core. The core and the cladding are adapted such that the core has a higher refractive index than the cladding on the side of the input end, and that a value given through subtraction of the refractive index of the cladding from the refractive index of the core on the side of the output end is smaller than a value given through subtraction of the refractive index of the cladding from the refractive index of the core on the side of the input end.

With the laser light emitting device thus configured, since the refractive index of the core at the input end side is higher than that of the cladding, laser light propagates through the core when laser light is input from the input end into the core. Since the core is provided along the central axis of the glass rod, laser light propagates along the central axis of the glass rod. Thus, forming the core along the central axis enables most laser light to propagate along the central axis of the glass rod even in the case where laser light is input at an angle relative to the glass rod. Since the value given through subtraction of the refractive index of the cladding from the refractive index of the core at the output end side is set smaller than the value given through subtraction of the refractive index of the cladding from the refractive index of the core at the input end side, the power to confine light within the core is weaker at the output end side than at the input end side. Hence, of laser light, components with a relatively large numerical aperture (NA) propagate through the core at the input end side but propagate from the core into the cladding on the output end side, such that the beam diameter of the laser light becomes large. At this time, as the laser light propagates along the central axis of the glass rod, a portion of the laser light is suppressed from being reflected on a side surface of the glass rod even when the diameter of the laser light spreads, as compared with the case where the laser light travels at an angle relative to the central axis of the glass rod. Hence, with the use of such a laser light emitting device, a fiber laser apparatus is achieved which is configured to emit laser light in a desired output shape.

In the laser light emitting device, the refractive index of the core on the output end side is preferably adapted to be equal to or lower than the refractive index of the cladding.

In such a laser light emitting device, since a waveguide structure is not formed at the output end side, hence providing a free propagation area, the beam diameter of components of laser light with a relatively small NA also becomes larger. Hence, more uniform power intensity is achieved with the laser light at the output end.

In the laser light emitting device, the laser light emitting device suitably includes an area in which the core has a gradually lowering refractive index with respect to the refractive index of the cladding from the input end side toward the output end side.

Such a laser light emitting device allows for suppression of Fresnel reflection of laser light that may occur between the amplifier optical fiber and the glass rod, thus allowing for unexpected oscillation even in the case of a laser structure having an amplifier optical fiber with a higher gain.

However, since it is known that the Fresnel reflection of light is more likely to occur with respect to change in refractive index that is steeper than the wavelength of the light itself, the area in which the core has a gradually lowering refractive index is preferably adapted to be longer than the wavelength of laser light to be input.

Further, a fiber laser apparatus of the present invention includes: an optical fiber that has a core and is configured to output laser light; and the above-described laser light emitting device having a larger diameter than the core of the optical fiber. The output end for the laser light of the optical fiber is fused to the input end of the laser light emitting device in such a manner that the core of the optical fiber and the core of the laser light emitting device are spliced to each other.

With such a fiber laser apparatus, in the case where the output end of the optical fiber is fused to the input end of the glass rod with the central axis of the optical fiber being at an angle deviating from the central axis of the glass rod of the laser light emitting device, the laser light to be output from the core of the optical fiber is transmitted along the central axis of the glass rod. On the output end side of the glass rod, the diameter of the laser light spreads along the central axis, with the result that the power intensity of the laser light on the output end is reduced, allowing for output of laser light in a desired output shape.

A method of manufacturing a laser light emitting device of the present invention includes: a preparation step of preparing a glass rod having an input end and an output end, a core, and a cladding covering the core, the core being doped with a dopant that has an action to cause the refractive index thereof to be higher than the refractive index of the cladding upon ultraviolet irradiation; and an ultraviolet irradiation step of applying a larger amount of ultraviolet light to the input end side than to the output end side, in such a manner that the refractive index of the core is set higher than the refractive index of the cladding at least on the input end side of the glass rod.

According to such a method of manufacturing a laser light emitting device, ultraviolet light is applied to a glass rod that is adapted such that the core thereof comes to have a higher refractive index than the cladding upon ultraviolet irradiation; in this manner, at least the refractive index of the core on the input end side is set higher than the refractive index of the cladding, so as to form a light waveguide structure at least on the input end side. Then, the ultraviolet light is applied by a larger amount to the input end side than to the output end side, such that a value given through subtraction of the refractive index of the cladding from the refractive index of the core on the output end side is set smaller than a value given through subtraction of the refractive index of the cladding from the refractive index of the core on the input end side. More specifically, the power to confine light within the core on the output end side can be made weaker than on the input end side. Thus, the dopant concentration does not have to be varied in the longitudinal direction of the glass rod, which allows for easy manufacture of a laser light emitting device as described above that has refractive index variation in the longitudinal direction of the glass rod.

In the glass rod to be prepared in the preparation step of the method of manufacturing a laser light emitting device, the core preferably has a refractive index equal to or lower than the refractive index of the cladding.

According to such a method of manufacturing a laser light emitting device, in the ultraviolet irradiation step, the amounts of ultraviolet irradiation are controlled on the input end side and on the output end side, which permits more free control over the values obtained through subtraction of the refractive index of the cladding from the refractive index of the core on the input end side and on the output end side.

In the ultraviolet irradiation step of the method of manufacturing a laser light emitting device, ultraviolet irradiation is preferably adjusted such that the refractive index of the core on the output end side of the glass rod is kept from being higher than the refractive index of the cladding.

This way of ultraviolet irradiation enables manufacture of a laser light emitting device with a waveguide structure not formed on the output end side and thus providing a free propagation area.

In the ultraviolet irradiation step of the method of manufacturing a laser light emitting device, ultraviolet irradiation is preferably not performed on the output end side of the glass rod.

By failing to perform ultraviolet irradiation on the output end side, namely, by performing ultraviolet irradiation for zero time on the output end side, the ultraviolet irradiation step is facilitated, allowing for manufacture at lower cost of a laser light emitting device with a waveguide structure not formed on the output end side.

Alternatively, a method of manufacturing a laser light emitting device of the present invention includes: a preparation step of preparing a glass rod having an input end and an output end, a core, and a cladding covering the core, the core having a higher refractive index than the cladding, the cladding being doped with a dopant that has an action to cause the refractive index thereof to be higher than the refractive index of the core upon ultraviolet irradiation; and an ultraviolet irradiation step of applying a larger amount of ultraviolet light to the output end side than to the input end side, within a range in which the refractive index of the core on the input end side remains higher than the refractive index of the cladding.

According to such a method of manufacturing a laser light emitting device, a glass rod is prepared in which the core has a higher refractive index than the cladding, namely, a waveguide structure is provided, and ultraviolet light is applied by a larger amount to the output end side than to the input end side, such that the waveguide structure on the output end side is weakened. Hence, the dopant concentration does not have to be varied in the longitudinal direction of the glass rod, and the above-described laser light emitting device with refractive index variation in the longitudinal direction of the glass rod becomes easily obtainable.

Further, in the ultraviolet irradiation step of the method of manufacturing a laser light emitting device, ultraviolet irradiation is preferably continued until the refractive index of the cladding on the output end side of the glass rod becomes equal to or higher than the refractive index of the core.

This way of ultraviolet irradiation enables manufacture of a laser light emitting device with a waveguide structure not formed on the output end side and thus providing a free propagation area.

In the ultraviolet irradiation step of the method of manufacturing a laser light emitting device, ultraviolet irradiation is preferably not performed on the input end side of the glass rod.

By failing to perform ultraviolet irradiation to the input end side, the ultraviolet irradiation step is facilitated, allowing for manufacture at lower cost of a laser light emitting device with a waveguide structure formed on the input end side.

EFFECTS OF THE INVENTION

As described above, according to the present invention, there are provided a laser light emitting device that enables achievement of a fiber laser apparatus configured to output laser light in a desired output shape, and a method of manufacturing the device, and a fiber laser apparatus using the device.

EMBODIMENT OF THE INVENTION

Preferred embodiments of a fiber laser apparatus according to the present invention are described in detail below with reference to the drawings.

First Embodiment

Figure 1:
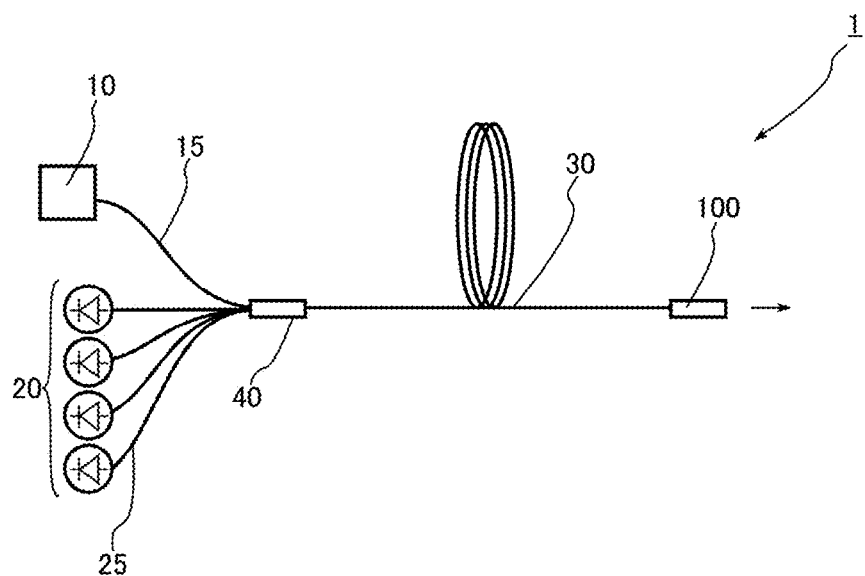
FIG. 1 illustrates a fiber laser apparatus according to a first embodiment of the present invention.

FIG. 1 illustrates a fiber laser apparatus according to a first embodiment of the present invention.

As illustrated in FIG. 1, a fiber laser apparatus 1 includes as its principal components a seed laser light source 10 for outputting seed laser light, an excitation light source 20 for outputting excitation light, an amplifier optical fiber 30 for amplifying seed laser light, a light combiner 40 for inputting seed laser light and excitation light into the amplifier optical fiber 30, and a glass rod 100 serving as a laser light emitting device for letting in laser light to be output from the amplifier optical fiber 30.

The seed laser light source 10 is constituted by a fiber laser apparatus of Fabry-Perot type or optical fiber ring type and is configured to output seed laser light. The seed laser light is pulsed light or continuous light, which has, for example, a wavelength of 1064 nm. The seed laser light output from the seed laser light source 10 is transmitted through a single-mode fiber 15 including a core and a cladding covering the core.

The excitation light source 20 includes a plurality of laser diodes (LD). The excitation light source 20 outputs, for example, excitation light of a wavelength of 976 nm in the case that the seed laser light to be output from the seed laser light source 10 is 1064 nm in wavelength as described above. The excitation light output from the excitation light source is transmitted through a multimode fiber 25 that includes a core and a resin cladding covering the core and is configured to transmit excitation light as multimode light.

Figure 2:
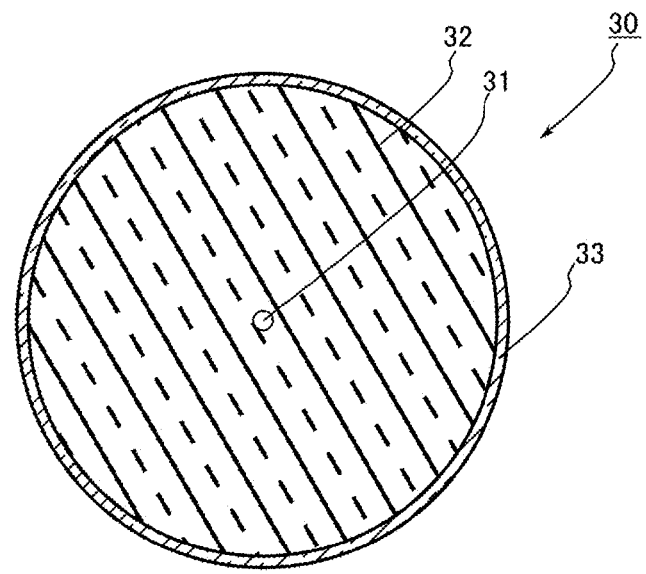
FIG. 2 illustrates the structure at a cross section in a direction perpendicular to the longitudinal direction of an amplifier optical fiber of FIG. 1.
Figure 3:
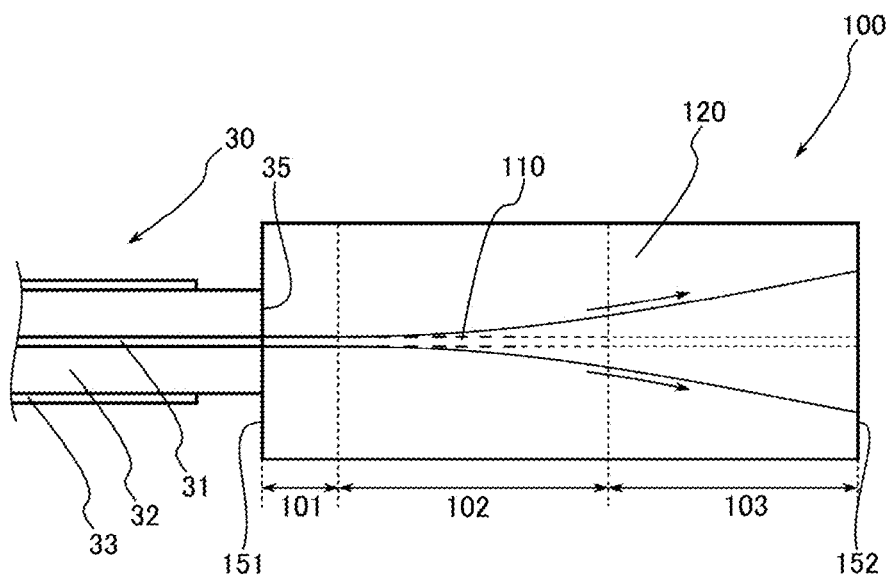
FIG. 3 is an enlarged view of a glass rod of FIG. 1.

FIG. 2 is a cross-sectional view depicting the structure at a cross section in a direction perpendicular to the longitudinal direction of the amplifier optical fiber 30 of FIG. 1. The amplifier optical fiber 30 has an input end for letting in seed laser light and excitation light and an output end for outputting amplified seed laser light as laser light. The amplifier optical fiber 30 is configured to amplify the seed laser light to be input from the input end into laser light having the same wavelength range as the seed laser light and to output the laser light from the output end. As illustrated in FIG. 3, the amplifier optical fiber 30 includes a core 31, a cladding 32 covering the core 31, and a resin cladding 33 covering the cladding 32. The refractive index of the cladding 32 is lower than the refractive index of the core 31, and the refractive index of the resin cladding 33 is set much lower than the refractive index of the cladding 32. The diameter of the core 31 is set to, for example, 30 μm, the outer diameter of the cladding is set to, for example, 400 μm, and the outer diameter of the resin cladding is set to, for example, 450 μm. Exemplary constituent materials of the core 31 include quartz that is doped with an element such as germanium oxide that has an action to raise the refractive index of quartz and a rare earth element such as erbium that is excitable by excitation light to be output from the excitation light source 20. Exemplary constituent materials of the cladding 32 include quartz that is not specifically doped with a dopant. Exemplary constituent materials of the resin cladding include an ultraviolet curing resin.

The light combiner 40 is configured such that the single-mode fiber 15 that is connected with the seed laser light source 10 and the multimode fiber 25 that is connected with the excitation light source 20 are fused with the input end of the amplifier optical fiber 30. Specifically, the central axis of the core of the single-mode fiber 15 is positionally aligned to the central axis of the core 31 of the amplifier optical fiber 30 to be in line with each other in the longitudinal direction, such that the input end of the amplifier optical fiber 30 and an end of the single-mode fiber 15 are connected at their endfaces. Further, the core of the multimode fiber 25 and the cladding 32 of the amplifier optical fiber 30 are positionally aligned to each other to be in line with each other in the longitudinal direction, such that the input end of the amplifier optical fiber 30 is connected to the end of the multimode fiber 25 at their endfaces. In the case where a plurality of multimode fibers 25 is provided, the single-mode fiber 15 is connected to the amplifier optical fiber 30 in such a manner that the side surface of the single-mode fiber 15 is encircled by the multimode fibers 25. At the light combiner 40, seed laser light from the seed laser light source 10 and excitation light from the excitation light source 20 enter from the input end into the amplifier optical fiber 30.

The output end of the amplifier optical fiber 30 is fused to the glass rod 100.

FIG. 3 is an enlarged view of the glass rod 100 of FIG. 1. The glass rod 100 has a columnar shape with an input end 151 and an output end 152. The glass rod 100 includes a core 110 and a cladding 120 covering the core 110. The core 110 is formed along the central axis of the glass rod 100. The glass rod 100 is integral in the longitudinal direction with no joined portion.

The diameter of the glass rod 100 is set larger than the diameter of the core 31 of the amplifier optical fiber 30. In the present embodiment, the glass rod 100 has a larger diameter than the cladding 32 of the amplifier optical fiber 30. The glass rod 100 is preferably configured to have, for example, a diameter of 400 μm or larger in the case where the diameter of the core 31 of the amplifier optical fiber 30 is 30 μm and the diameter of the cladding 32 is 400 μm as described above, and to have, for example, a length of 1.5 mm to 2.0 mm in the case where the numerical aperture of the propagation mode is 0.1 and the cladding diameter is 400 μm. The diameter of the core 110 is preferably equal to the diameter of the core of the amplifier optical fiber 30 in terms of propagation of laser light.

The refractive index n11 of the core 110 in an area 101 having a predetermined length L1 from the input end 151 of the glass rod 100 is set higher than the refractive index n21 of the cladding 120 in the area 101. The refractive index n11 of the core 110 and the refractive index n21 of the cladding 120 are both set constant. The length L1 of the area 101 is preferably 0.3 mm or greater if the NA of the propagation mode of the amplifier optical fiber 30 is 0.1 and the diameter of the core 110 is 30 μm, in terms of angle correction of laser light.

In an area 102 with a length L2 that is adjacent to the area 101 on the side of the output end 152, the refractive index n12 of the core 110 becomes gradually lower than the refractive index n22 of the cladding 120 from the input end 151 side toward the output end 152 side. Specifically, the value given by subtracting the refractive index n22 of the cladding 120 from the refractive index n12 of the core 110 becomes gradually lower from the input end 151 side toward the output end 152 side. The length L2 of the area 102 is preferably longer than the wavelength of the laser light to be input to the glass rod 100 and twice as long as the wavelength of the laser light, in terms of suppression of Fresnel reflection light of laser light. In the present embodiment, the refractive index n12 of the core 110 in the area 102 is adapted to be equal to the refractive index n11 of the core 110 in a portion in the area 102 that is closest to the input end 151 side, and to be higher than the refractive index n22 of the cladding 120. In the area 102, difference in refractive index between the core 110 and the cladding 120 becomes gradually smaller toward the output end 152 side, such that the refractive index n12 of the core 110 is set approximately equal to the refractive index n22 of the cladding 120 at a portion closest to the output end 152 side in the area 102.

Difference in refractive index does not exist between the core 110 and the cladding 120 in an area 103 that is adjacent to the area 102 and extends to the output end 152, and the refractive indices are equal to each other. Hence, in the glass rod 100, the value given by subtracting the refractive index n22 of the cladding 120 from the refractive index n12 of the core 110 at the output end 152 side is set smaller than the value given by subtracting the refractive index n22 of the cladding 120 from the refractive index n12 of the core 110 at the input end 151 side. The lower limit for the length L3 of the area 103 is determined by the NA of the area 101 and the power intensity permissible at the emitting end, and the upper limit for the length L3 is determined by the NA of the area 101 and the outer diameter of the glass rod 100.

For example, in the case where the wavelength of the laser light is 1064 nm and the NA is 0.1 as described above, the length L1 of the area 101 of the glass rod 100 is set to 0.3 mm or greater, and the length L2 of the area 102 is set to 2 μm or greater, and the area 103 is set within a length of, for example, 1.5 mm to 2.0 mm. As exemplary materials for use in the glass rod 100, materials of the core 110 include quartz doped with germanium oxide ($GeO_2$), and materials of the cladding 120 include quartz doped with aluminum oxide ($Al_2O_3$).

The input end 151 of the glass rod 100 is fused with the output end 35 of the amplifier optical fiber 30. Specifically, the output end 35 of the amplifier optical fiber 30 is fused with the input end 151 of the glass rod, such that the core 31 of the amplifier optical fiber 30 and the core 110 of the glass rod are spliced to each other in the longitudinal direction of the glass rod 100.

Description is given next of the output of laser light of the fiber laser apparatus 1.

First, seed laser light is output from the seed laser light source 10 and excitation light is output from the excitation light source 20. The seed laser light to be output from the seed laser light source 10 propagates through the single-mode fiber 15 as single-mode light. The excitation light to be output from the excitation light source 20 propagates through multimode fiber 25 as multimode light. The seed laser light and excitation light enter the amplifier optical fiber 30 at the light combiner 40. The seed laser light that has entered the amplifier optical fiber 30 propagates through the core 31 of the amplifier optical fiber 30 as single-mode light, and the excitation light propagates through the core 31 and the cladding 32 of the amplifier optical fiber 30 as multimode light. When the excitation light passes the core 31, a portion of the excitation light is absorbed into the rare earth element doped into the core 31, such that the rare earth element becomes excited. The rare earth element thus excited is induced by the seed laser light to cause simulated emission to amplify the intensity of the seed laser light. The seed laser light thus amplified is output as laser light from the output end 35 of the amplifier optical fiber 30.

The laser light output from the output end 35 of the amplifier optical fiber 30 enters the core 110 of the glass rod 100. At this time, even in the case where the output end 35 of the amplifier optical fiber 30 is not perpendicular to the central axis of the amplifier optical fiber 30 and the amplifier optical fiber 30 and the glass rod 100 are fused to each other with the central axis of the glass rod 100 at an angle relative to the central axis of the amplifier optical fiber 30, the laser light output from the output end 35 propagates through the core 110 of the glass rod 100.

The laser light that propagates through the core 110 travels through the core 110 in the area 101. In the area 102, difference in refractive index becomes gradually smaller between the core 110 and the cladding 120, and thus the laser light that propagates through the core 110 gradually spreads into the cladding 120 sequentially from components with a larger NA, as the laser light travels through the area 102. In the area 103, refractive indices are equal to each other between the core 110 and the cladding 120, and thus the beam diameter of the laser light becomes larger in association with the NA of the laser light.

In the present embodiment, the length L2 of the area 102 is set greater than the wavelength of the laser light, and an area is provided in which the refractive index of the core area of the area 102 becomes gradually lower relative to the refractive index of the cladding area of the area 102; thus, reduction is achieved with Fresnel reflection that may occur against the amplifier optical fiber 30 in the area 102.

The laser light with a diameter thus spread in the glass rod 100 is output from the output end 152 of the glass rod 100.

With the fiber laser apparatus 1 of the present embodiment, in the glass rod 100 that is fused to the output end 35 of the amplifier optical fiber 30 to serve as a laser light emitting device, the core 110 of the glass rod 100 on the input end 151 side has a higher refractive index than the cladding 120, and therefore, when laser light is input from the input end 151 to the core 110, the laser light propagates through the core 110. Since the core 110 is formed along the central axis of the glass rod 100, the laser light propagates along the central axis of the glass rod 100. Thus, because of the core 110 being formed along the central axis, laser light propagates along the central axis of the glass rod 100 even in the case where laser light is input angularly to the glass rod 100. Hence, the laser light output from the core 31 of the amplifier optical fiber 30 propagates along the central axis of the glass rod 100 even in the case where the output end 35 of the amplifier optical fiber 30 is fused with the input end 151 of the glass rod 100 with the central axis of the amplifier optical fiber 30 at an angle relative to the central axis of the glass rod 100. The value given by subtracting the refractive index n22 of the cladding 120 from the refractive index n12 of the core 110 on the output end 152 side is set smaller than the value given by subtracting the refractive index n22 of the cladding 120 from the refractive index n12 of the core 110 on the input end 151 side; for this reason, the power to confine light within the core 110 is weaker on the output end 152 side than on the input end 151 side. Hence, of laser light, components with a relatively large NA propagate through the core on the input end 151 side, while on the output end 152 side, light propagates from the core 110 into the cladding 120, such that the beam diameter of the laser light becomes larger. At this time, as the laser light propagates along the central axis of the glass rod 100, a portion of the laser light is suppressed from being reflected at the side surface of the glass rod 100 even when the diameter of the laser light spreads, as compared with the case in which the laser light travels at an angle relative to the central axis of the glass rod 100. Thus, the fiber laser apparatus 1 is configured to emit laser light of a desired output shape.

Specifically in the present embodiment, refractive indices are equalized between the core 110 and the cladding 120 in the area 103 on the output end 152 side. Hence, in the area 103 on the output end 152 side, a waveguide structure is not formed, thus providing a free propagation area, and the beam diameter of components of laser light with a relatively small NA thus also becomes larger. Accordingly, more uniform power intensity is achieved with the laser light to be output at the output end 152.

Description is given next of a method of manufacturing the glass rod 100.

First Manufacturing Method

A first method of manufacturing the glass rod 100 is described for a start.

Prepared first is a glass rod having an input end 151 and an output end 152, a core 110, and a cladding 120 that covers the core 110 in such a manner that the core 110 is positioned along the central axis (a preparation step).

The glass rod is adjusted such that the core 110 and the cladding 120 have approximately equal refractive indices in a state where ultraviolet irradiation is not performed. A dopant is doped into the core 110, which dopant causes the refractive index of the core 110 to be higher than the refractive index of the cladding 120 upon ultraviolet irradiation. Exemplary materials of the core 110 and the cladding 120 include, but not limitatively, quartz that is doped with a dopant as listed in Table 1.

TABLE 1

| | Dopant for the core | Dopant for the cladding |
|---|---|---|
| A | GeO2 (F, B) | Al2O3, P2O5, TiO2 |
| B | P2O5, (F, B) | Al2O3, TiO2 |
| C | GeO2, Al2O3, P2O5, TiO2 + F, B | — |

The A column in Table 1 shows that quartz doped with germanium oxide is used as a material of the core 110, and that quartz doped with one kind of dopant or co-doped with two or more kinds of dopants from alumina, diphosphorus pentaoxide ($P_2O_5$), and titanium oxide ($TiO_2$) is used as a material of the cladding 120. Germanium oxide is a dopant that causes the refractive index of the core 110 to rise upon ultraviolet irradiation. Alumina, diphosphorus pentaoxide, and titanium oxide are dopants that allows for adjustment such that the refractive index of the cladding is raised to approximately equalize the refractive index of the core 110 and the refractive index of the cladding in a state where ultraviolet irradiation is not performed. Dopants such as alumina, diphosphorus pentaoxide, and titanium oxide are capable of raising the refractive index of the cladding 120 upon ultraviolet irradiation, but the rising rate of the refractive index is very small as compared with that of the core 110 doped with germanium oxide. Hence, with such materials, the refractive index of the core 110 and the refractive index of the cladding 120 are approximately equalized in a state where ultraviolet irradiation is not performed, and when ultraviolet light is applied to the glass rod, the refractive index of the core 110 becomes higher than the refractive index of the cladding 120. As shown in the parentheses in the A column, the core 110 may be co-doped with any of dopants of, for example, fluorine (F) and boron (B) that act to lower the refractive index together with germanium oxide in order for the refractive index of the core 110 to be adjusted to approximately equal to the refractive index of the cladding 120 in a state where ultraviolet irradiation is not performed.

The B column of Table 1 shows that quartz doped with diphosphorus pentaoxide is used as a material of the core 110, and that quartz doped with one of alumina or titanium oxide or co-doped with both of them is used a material of the cladding 120. Upon ultraviolet irradiation, quartz doped with diphosphorus pentaoxide comes to have a higher refractive index than quartz doped with alumina and/or titanium oxide. Where ultraviolet irradiation is not performed, alumina and/or titanium oxide is/are used to adjust the refractive index of the cladding 120 approximately equal to the refractive index of the core 110. As indicated in the parentheses in the B column, the core 110 may be co-doped with any of dopants of, for example, fluorine and boron that act to lower the refractive index together with diphosphorus pentaoxide in order to adjust the refractive index of the core 110 approximately equal to the refractive index of the cladding 120 where ultraviolet irradiation is not performed.

The C column of Table 1 shows that quartz doped with one or two or more kinds of dopants of germanium oxide, diphosphorus pentaoxide, aluminum oxide, and titanium oxide is used as a material for the core 110, the quartz being co-doped with any of dopants of, for example, fluorine and boron that act to lower the refractive index, and that quartz with no dopant doped is used as a material for use for the cladding 120. In this case, where ultraviolet irradiation is not performed, the refractive index of the core 110 is adjusted so as to be approximately equal to the refractive index of quartz by the action to raise the refractive index of, for example, germanium oxide and the action to lower the refractive index of, for example, fluorine or boron. Upon ultraviolet irradiation, for example, germanium oxide acts to raise the refractive index of the core 110.

Next, ultraviolet light is applied to the glass rod thus prepared at the input end 151 side in the longitudinal direction (an ultraviolet irradiation step).

Figure 4:
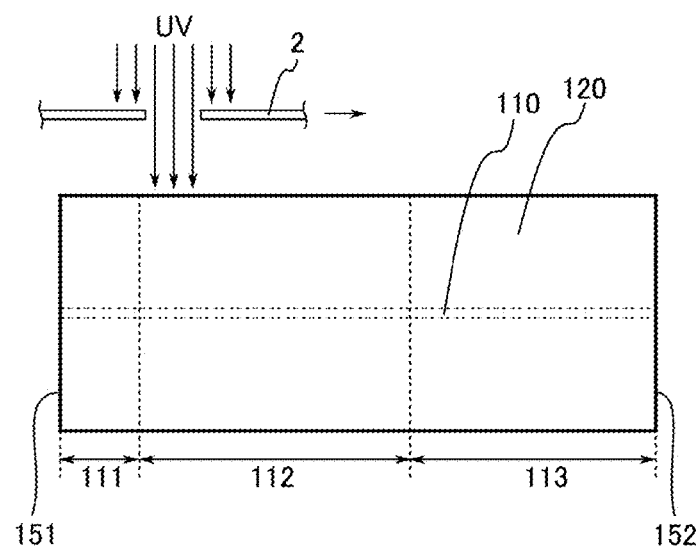
FIG. 4 schematically illustrates an ultraviolet irradiation step of a first manufacturing method.

FIG. 4 schematically illustrates the ultraviolet irradiation step of the first manufacturing method. As illustrated in FIG. 4, ultraviolet light UV is restricted by a masking 2 to be applied to a limited area, so that a portion of the glass rod is irradiated with UV. The masking 2 is moved relative to the glass rod from the input end 151 side of the glass rod toward the output end 152 thereof. Hence, ultraviolet light UV is movingly applied from the input end 151 side toward the output end 152 of the glass rod.

Figure 5:
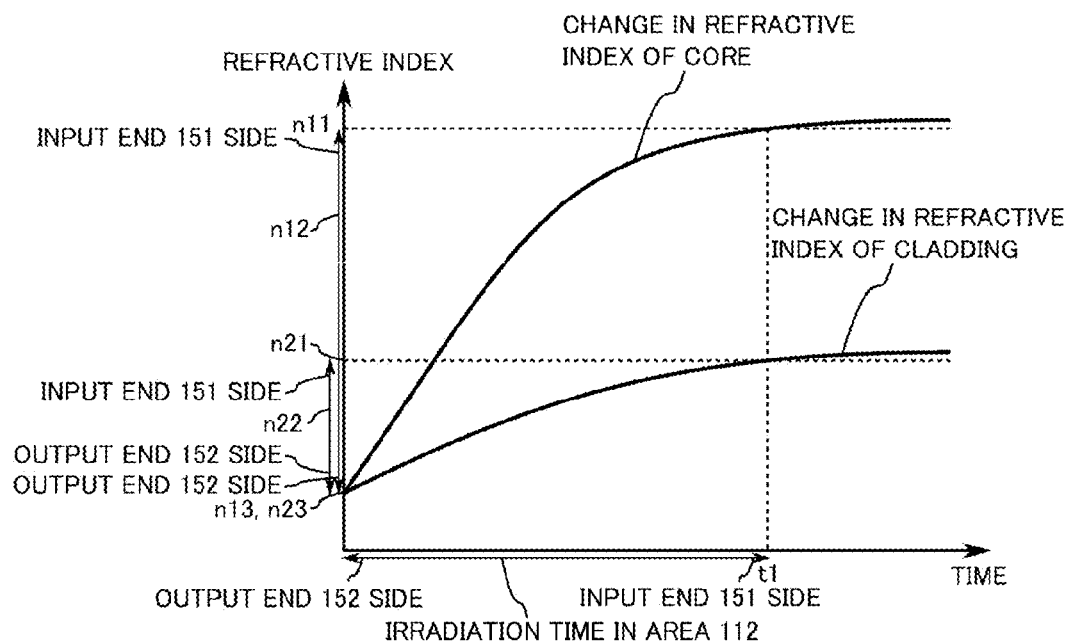
FIG. 5 illustrates a profile showing time for irradiating a glass rod to be used in the first manufacturing method with ultraviolet light and rise in refractive index of a core and a cladding.

FIG. 5 illustrates a profile indicating the time for ultraviolet irradiation to the glass rod for use in the first manufacturing method along with the rise in refractive index of the core 110 and the cladding 120. As described above, the core 110 is doped with a dopant that causes the refractive index of the core 110 to be higher than the refractive index of the cladding 120 upon ultraviolet irradiation; thus, even if the core 110 and the cladding 120 have equal refractive indices before ultraviolet irradiation, as ultraviolet irradiation continues, the refractive index of the core 110 becomes higher than the refractive index of the cladding 120. It is noted that, in the glass rod used in the profile in FIG. 5, quartz doped with germanium oxide is used for the core 110, and that quartz doped with alumina is used for the cladding 120.

In the ultraviolet irradiation step, the area 101 is first irradiated with ultraviolet light UV. In the area 101, the masking 2 is moved at a constant speed relative to the glass rod, such that the glass rod in the area 101 is wholly irradiated with ultraviolet light for time t1 indicated in FIG. 5. In this manner, as indicated in FIG. 5, after the application of ultraviolet light UV to the area 101, the refractive index n11 of the core 110 in the area 101 is set higher than the refractive index n21 of the cladding 120 in the area 101.

Next, in the area 102, the speed of the masking 2 relative to the glass rod is set at the same speed in the area 101 on the input end 151 side, and as the masking 2 proceeds toward the output end 152 side, the speed of the masking 2 is fastened relative to the glass rod. In this manner, in the area 102, as indicated in FIG. 5, ultraviolet light UV is applied for approximately the same period of time as in the area 101 on the input end 151 side, and toward the output end 152 side, time period for ultraviolet light UV application is shortened until almost no ultraviolet light UV is applied on the output end 152 side. Thus, in the area 102, ultraviolet light is applied by a larger amount to the input end 151 side than to the output end 152 side, and from the input end 151 side toward the output end 152 side, the refractive index n12 of the core 110 is gradually decreased relative to the refractive index n22 of the cladding 120.

In the area 103, ultraviolet light UV application is not performed. In other words, ultraviolet light UV is applied for zero period of time. Hence, in the area 103, the refractive index n13 of the core 110 is maintained approximately equal to the refractive index n23 of the cladding 120.

In this manner, the glass rod 100 as illustrated in FIG. 3 is obtained.

According to the method of manufacturing the glass rod 100 of the present embodiment, ultraviolet irradiation is performed on a glass rod in which the core 110 comes to have a higher refractive index than the cladding 120 upon ultraviolet irradiation; in this manner, the refractive index n11 of the core 110 is set higher than the refractive index n21 of the cladding 120 at least in the area 101 on the input end 151 side, so as to form a light waveguide structure at least in the area 101 on the input end 151 side. Then, the ultraviolet light is applied by a larger amount to the input end 151 side than to the output end 152 side, such that a value given by subtracting the refractive index n23 of the cladding 120 from the refractive index n13 of the core 110 on the output end 152 side is settable to a smaller value than a value given by subtracting the refractive index n21 of the cladding 120 from the refractive index n11 of the core 110 on the input end 151 side. In other words, power to confine light within the core 110 is adjustable to be weaker on the output end 152 side than on the input end 151 side. Thus, the dopant concentration does not have to be varied in the longitudinal direction of the glass rod, so that a glass rod 100 serving as a laser light emitting device becomes obtainable.

Specifically in the present embodiment, the refractive index of the core 110 is equal to or lower than the refractive index of the cladding in the glass rod to be prepared in the preparation step, and the glass rod is not irradiated with ultraviolet light on the output end 152 side in the ultraviolet irradiation step. Thus, the ultraviolet irradiation step is facilitated, which allows for manufacture at lower cost of a laser light emitting device that does not have a waveguide structure on the output end 152 side.

Second Manufacturing Method

A second method of manufacturing a glass rod 100 is described next.

Prepared first is a glass rod having an input end 151 and an output end 152, a core 110, and a cladding 120 that covers the core 110 (a preparation step).

The glass rod is adjusted such that the core 110 has a higher refractive index than the cladding 120 in a state where ultraviolet irradiation is not performed. In other words, the glass rod is adjusted so as to have a waveguide structure in a state where ultraviolet irradiation is not performed. A dopant is doped into the cladding 120, which dopant causes the refractive index thereof to be equal to or higher than the refractive index of the core 110 upon ultraviolet irradiation. Exemplary materials of the core 110 and the cladding 120 include, but not limitatively, quartz that is doped with a dopant as listed in Table 2.

TABLE 2

|   | Dopant for the core | Dopant for the cladding |
|---|---|---|
| A | Al2O3, P2O5, TiO2 | GeO2 (F, B) |
| B | Al2O3, TiO2 | P2O5 (F, B) |

The A column in Table 2 shows that quartz doped with one kind of dopant or co-doped with two or more kinds of dopants from alumina, diphosphorus pentaoxide, and titanium oxide is used as a material of the core 110, and that quartz doped with germanium oxide is used as a material of the cladding 120. The amounts of these dopants are adjusted such that the refractive index of the core 110 is set higher than the refractive index of the cladding in a state where ultraviolet irradiation is not performed. Dopants such as alumina, diphosphorus pentaoxide, and titanium oxide are capable of raising the refractive index of the core 110 upon ultraviolet irradiation, but the rising rate of the refractive index is very small as compared with that of the cladding 120 doped with germanium. Hence, upon ultraviolet irradiation, the refractive index of the cladding 120 is allowed to be equal to or higher than the refractive index of the core. As shown in the parentheses in the A column, the cladding 120 may be co-doped with any of dopants of, for example, fluorine and boron that act to lower the refractive index in order for the refractive index of the cladding 120 to be set lower than the refractive index of the core 110 in a state where ultraviolet irradiation is not performed.

The B column of Table 2 shows that quartz doped with one of alumina ($Al_2O_3$) or titanium oxide ($TiO_2$) or co-doped with both of them is used a material of the core 110 and that quartz doped with diphosphorus pentaoxide is used as a material of the cladding 120. Quartz doped with diphosphorus pentaoxide comes to have a higher refractive index than quartz doped with alumina and/or titanium oxide upon ultraviolet irradiation. Where ultraviolet irradiation is not performed, alumina and/or titanium oxide is/are used to adjust the refractive index of the core 110 approximately equal to the refractive index of the cladding 120. As indicated in the parentheses in the B column, the cladding 120 may be co-doped with any of dopants of, for example, fluorine and boron that act to lower the refractive index together with diphosphorus pentaoxide in order to set the refractive index of the cladding 120 lower than the refractive index of the core 110 in a state where ultraviolet irradiation is not performed.

Next, ultraviolet light is applied to the glass rod thus prepared at the output end 152 side in the longitudinal direction (an ultraviolet irradiation step).

Figure 6:
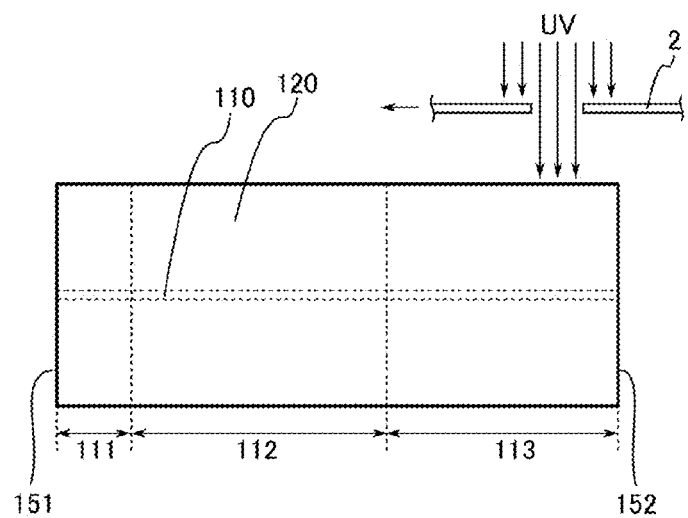
FIG. 6 schematically illustrates an ultraviolet irradiation step of a second manufacturing method.

FIG. 6 schematically illustrates the ultraviolet irradiation step of the second manufacturing method. As illustrated in FIG. 6, ultraviolet light UV is restricted by a masking 2 to be applied to a limited area, so that a portion of the glass rod is irradiated with UV. The masking 2 is moved relative to the glass rod from the output end 152 side of the glass rod toward the input end 151 thereof. Hence, ultraviolet light UV is movingly applied from the output end 152 side toward the input end 151 of the glass rod.

Figure 7:
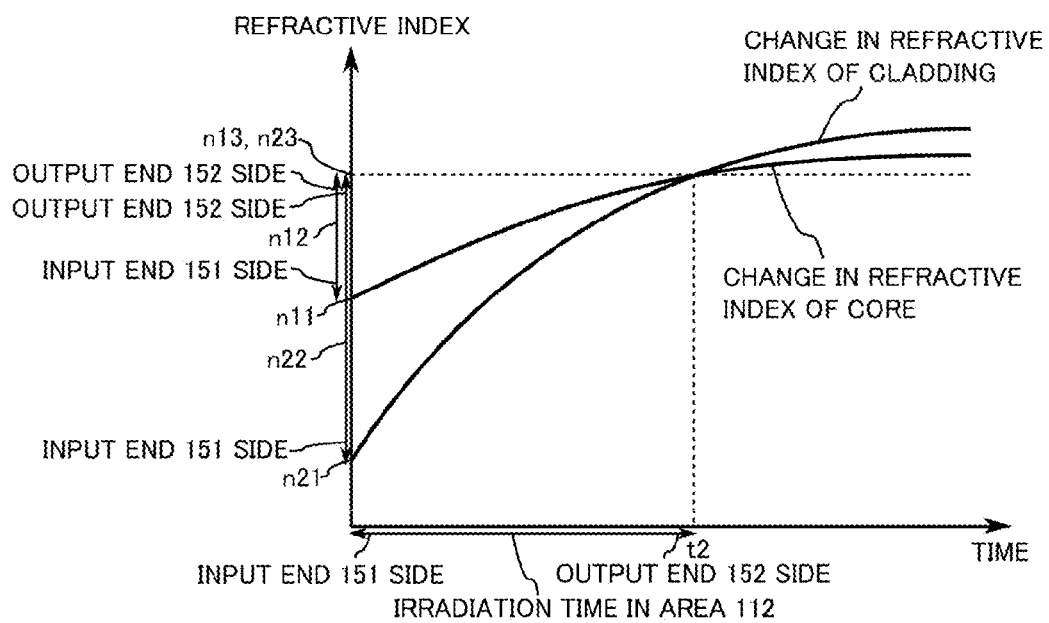
FIG. 7 illustrates a profile showing time for irradiating a glass rod to be used in the second manufacturing method with ultraviolet light and rise in refractive index of a core and a cladding.

FIG. 7 illustrates a profile indicating the time for ultraviolet irradiation to the glass rod for use in the second manufacturing method along with the rise in refractive index of the core 110 and the cladding 120. As described above, the cladding 120 is doped with a dopant that causes the refractive index of the cladding 120 to be equal to or higher than the refractive index of the core 110 upon ultraviolet irradiation. The refractive index of the core 110 is thus set higher than the refractive index of the cladding 120 before ultraviolet irradiation. As ultraviolet irradiation continues, difference in refractive index becomes smaller between the cladding 120 and the core 110. With further ultraviolet irradiation, the refractive index of the core 110 becomes approximately equal to the refractive index of the cladding 120, and with still further ultraviolet irradiation, the refractive index of the cladding becomes higher than the refractive index of the core 110. It is noted that, in the glass rod used in the profile in FIG. 7, quartz doped with alumina is used for the core 110, and that quartz co-doped with germanium and boron is used for the cladding 120.

In the ultraviolet irradiation step, the area 103 is first irradiated with ultraviolet light UV. In the area 103, the masking 2 is moved at a constant speed relative to the glass rod, and the glass rod in the area 103 is wholly irradiated with ultraviolet light until the refractive index n13 of the core 110 has become equal to the refractive index n23 of the cladding 120. In other words, ultraviolet irradiation is performed for time t2 indicated in FIG. 7. In this manner, in the area 103, as indicated in FIG. 7, the refractive index n23 of the cladding 120 is set approximately equal to the refractive index n13 of the core 110.

Next, in the area 102, the speed of the masking 2 relative to the glass rod is set at the same speed in the area 103 on the output end 152 side, and as the masking 2 proceeds toward the input end 151 side, the speed of the masking 2 is fastened relative to the glass rod. In this manner, as indicated in FIG. 7, in the area 102, ultraviolet light UV is applied for approximately the same period of time as in the area 103 on the output end 152 side, and toward the input end 151 side, time period for ultraviolet light UV application is shortened until almost no ultraviolet light UV is applied on the input end 151 side. Thus, in the area 102, ultraviolet light is applied by a larger amount to the output end 152 side than to the input end 151 side, and from the output end 152 side toward the input end 151 side, the refractive index n12 of the core 110 is gradually increased relative to the refractive index n22 of the cladding 120.

In the area 101, ultraviolet light UV application is not performed. Hence, in the area 101, the refractive index n11 of the core 110 is maintained higher than the refractive index n21 of the cladding 120.

In this manner, a glass rod 100 as illustrated in FIG. 3 is obtained.

According to the method of manufacturing the glass rod 100 in the present embodiment, a glass rod having a waveguide structure is prepared, and ultraviolet light is used to weaken the waveguide structure on the output end 152 side of the glass rod. Thus, the dopant concentration does not have to be varied in the longitudinal direction of the glass rod, so that the glass rod 100 serving as a laser light emitting device becomes obtainable.

Specifically in the method of manufacturing the laser light emitting device of the present embodiment, in the ultraviolet irradiation step, ultraviolet irradiation is performed until the refractive index n23 of the cladding 120 on the output end 152 side of the glass rod becomes equal to or higher than the refractive index n13 of the core 110. Thus, manufacture becomes possible of a laser light emitting device in which a waveguide structure is not formed on the output end 152 side, thus providing a free propagation area.

Further, according to the method of manufacturing a laser light emitting device of the present embodiment, since ultraviolet irradiation is not performed on the input end 151 side, the ultraviolet irradiation step is facilitated, which allows for manufacture at lower cost of a laser light emitting device having a waveguide structure formed on the input end 151 side.

Second Embodiment

Figure 8:
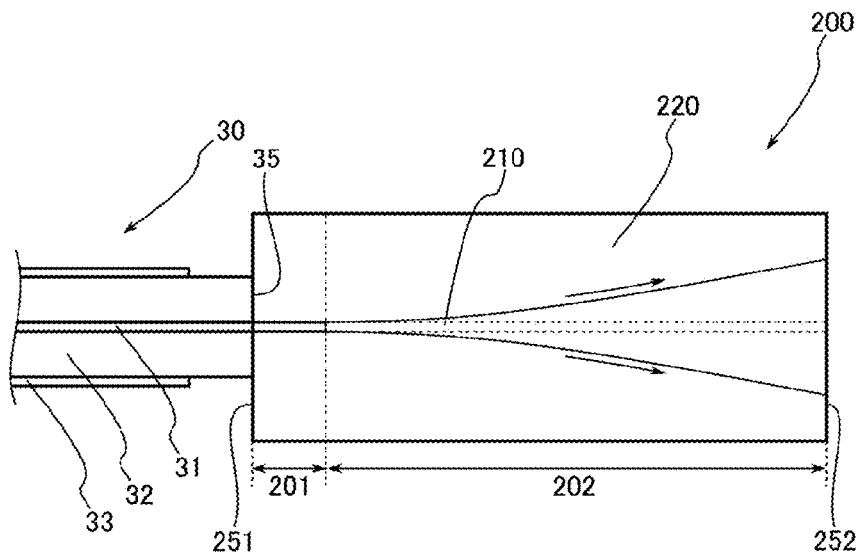
FIG. 8 illustrates a glass rod serving as a laser light emitting device according to a second embodiment of the present invention.

Description is given in detail next of a second embodiment of the present invention with reference to FIG. 8. Components that are the same as or similar to those of the first embodiment are assigned like reference numerals, and redundant description is not given. FIG. 8 illustrates a glass rod 200 serving as a laser light emitting device of a second embodiment of the present invention.

The fiber laser apparatus of the present embodiment is different from the first embodiment in that the glass rod 200 serving as a laser light emitting device illustrated in FIG. 8 is used in place of the glass rod 100 of the fiber laser apparatus 1 illustrated in FIG. 1.

As illustrated in FIG. 8, the glass rod 200 has a columnar shape with an input end 251 and an output end 252. The glass rod 200 is constituted by a core 210 and a cladding 220 covering the core 210. The core 210 is formed along the central axis of the glass rod 200. It is noted that the glass rod 200 is integral in the longitudinal direction with no joined portion.

The refractive index of the core 210 in an area 201 distant by a predetermined length L4 from the input end 251 of the glass rod 200 is set higher than the refractive index of the cladding 220 in the area 201, and the refractive index of the core 210 and the refractive index of the cladding 220 are set constant. The length L4 of the area 201 is, if the NA of the propagation mode of an amplifier optical fiber 30 is 0.12 and the diameter of the core 210 is 20 μm, preferably 0.2 mm or greater in terms of angle correction of laser light.

In an area 202 having a length L5, the area being adjacent to the area 201 on the output end 252 side and extends to the output end 252, the core 210 and the cladding 220 have equal refractive indices without difference in refractive index. The lower limit for the length L5 of the area 202 is determined by the NA of the mode of propagation through the amplifier optical fiber 30 and by the power intensity permissible at the output end 252, and the upper limit for the length L5 is determined by the NA of the mode of propagation through the amplifier optical fiber 30 and the outer diameter of the glass rod 200.

Such a glass rod 200 is manufactured in the following manner.

First Manufacturing Method

First prepared is a glass rod that is similar to that used for the first manufacturing method in the first embodiment (a preparation step). Hence, before ultraviolet irradiation, the refractive index of the core 210 and the refractive index of the cladding 220 are approximately equal to each other.

Next, the area 201 is irradiated with ultraviolet light (an ultraviolet irradiation step). The ultraviolet irradiation may be performed in the same manner as in the ultraviolet irradiation to the area 101 in the first manufacturing method of the first embodiment. This ultraviolet irradiation brings the refractive index of the core 210 higher than the refractive index of the cladding 220 in the area 201. In the area 202, ultraviolet irradiation is not performed.

Thus, a glass rod 200 as illustrated in FIG. 8 is obtained.

Second Manufacturing Method

The glass rod 200 may also be manufactured in the following manner.

First prepared is a glass rod that is similar to that used for the second manufacturing method in the first embodiment (a preparation step). Hence, before ultraviolet irradiation, the refractive index of the core 210 is set higher than the refractive index of the cladding 220.

Next, the area 202 is irradiated with ultraviolet light (an ultraviolet irradiation step). The ultraviolet irradiation may be performed in the same manner as in the ultraviolet irradiation to the area 103 in the second manufacturing method of the first embodiment. This ultraviolet irradiation brings the refractive index of the cladding 220 approximately equal to the refractive index of the core 210 in the area 202. In the area 201, ultraviolet irradiation is not performed.

In this manner, a glass rod 200 as illustrated in FIG. 8 is obtained.

The present invention has been elucidated by way of examples of the first and second embodiments, but the present invention is not limited thereto.

For example, in the first embodiment, an area 101 where the difference in refractive index between the core 110 and the cladding 120 is constant does not necessarily have to be provided. Without the area 101, since, in the area 102 on the input end 151 side, the refractive index n12 of the core 110 is higher than the refractive index n22 of the cladding 120, laser light that enters the glass rod 100 propagates through the core 110.

Further, in the first embodiment, the refractive index n13 of the core 110 in the area 103 is approximately equal to the refractive index n23 of the cladding 120; however, these refractive indices do not have to be equal, and the diameter of laser light is spreadable in the area 103 even with a structure in which the refractive index n23 of the cladding 120 is higher than the refractive index n13 of the core 110 in the area 103.

In this case, according to the first manufacturing method of the first embodiment, a glass rod is prepared in which the cladding 120 has a higher refractive index than the core 110 in the preparation step. In the ultraviolet irradiation step, ultraviolet irradiation may be performed in such a manner that the refractive index of the core 110 in the area 101 on the input end 151 side is set suitably higher than the refractive index of the cladding 120, that the refractive indices of the core 110 and the cladding 120 on the input end 151 side in the area 102 are set approximately equal to the refractive indices of the core 110 and the cladding 120 in the area 101, and that the refractive indices of the core 110 and the cladding 120 on the output end 152 side in the area 102 are set approximately equal to the refractive indices of the core 110 and the cladding 120 in the area 103. In the area 103 on the output end side, ultraviolet irradiation does not have to be performed, or ultraviolet irradiation may be performed for a little time such that the refractive index of the cladding 120 is maintained higher than the refractive index of the core 110. According to the second manufacturing method of the first embodiment, in the ultraviolet irradiation step, in irradiating the area 103 with ultraviolet light on the output end 152 side, ultraviolet irradiation may be continued until the refractive index of the cladding 120 becomes higher than the refractive index of the core 110.

Likewise, in the second embodiment, although the refractive index of the core 210 in the area 202 is set approximately equal to the refractive index of the cladding 220, these refractive indices do not necessarily have to be equal to each other. Even in the structure where the refractive index of the cladding 220 is set higher than the refractive index of the core 210 in the area 202, a waveguide structure is not formed in the area 202, which is preferred. In this case also, the diameter of the laser light is spreadable in the area 202.

In this case, according to the first manufacturing method of the second embodiment, in the preparation step, a glass rod is prepared in which the cladding 220 has a higher refractive index than the core 210. Then, in the ultraviolet irradiation step, ultraviolet irradiation may be performed such that the refractive index of the core 210 in the area 201 on the input end 251 side is suitably set higher than the refractive index of the cladding 220. In the area 202 on the output end side, ultraviolet irradiation does not have to be performed, or ultraviolet irradiation may be performed for a little time such that the refractive index of the cladding 220 is maintained higher than the refractive index of the core 210. According to the second manufacturing method of the second embodiment, in the ultraviolet irradiation step, in irradiating the area 202 on the output end 252 side with ultraviolet light, ultraviolet irradiation may be performed until the refractive index of the cladding 220 becomes higher than the refractive index of the core 210.

Further, it may be so configured that values given by subtracting the refractive indices of the claddings 120 and 220 from the refractive indices of the cores 110 and 210 in the areas on the output side are smaller than values given by subtracting the refractive indices of the claddings 120 and 220 from the refractive indices of the cores 110 and 210 in the areas on the input end side. Hence, in the first embodiment, as long as difference in refractive index between the core 110 and the cladding 120 in the area 101 is larger than difference in refractive index between the core 110 and the cladding 120 in the area 103, the core 110 may have a slightly higher refractive index than the cladding 120 in the area 103. Likewise, in the second embodiment, as long as difference in refractive index between the core 210 and the cladding 220 in the area 201 is larger than difference in refractive index between the core 210 and the cladding 220 in the area 202, the core 210 may have a slightly higher refractive index than the cladding 220 in the area 202. In such a case also, the power to confine light within the cores 110 and 210 is weaker on the side of the output ends 152 and 252 than on the sides of the input ends 151 and 251. Hence, of laser light, components with a relatively large NA propagate through the cores 110 and 210 on the sides of the input ends 151 and 251, whereas such components may be allowed to propagate from the cores 110 and 210 into the claddings 120 and 220 on the sides of the output ends 152 and 252, so as to spread the beam diameter of laser light.

In this case, according to the first manufacturing method of the first embodiment, in the ultraviolet irradiation step, the area 103 on the output end 152 side may be irradiated with ultraviolet light, such that the refractive index of the core 110 is set slightly higher than the refractive index of the cladding 120. According to the second manufacturing method of the first embodiment, in the ultraviolet irradiation step, in irradiating the area 103 on the output end 152 side with ultraviolet light, ultraviolet irradiation may be stopped at a timing where the refractive index of the core 110 becomes slightly higher than the refractive index of the cladding 120. According to the first manufacturing method of the second embodiment, in the ultraviolet irradiation step, the area 202 on the output end 252 side may be irradiated with ultraviolet light, such that the refractive index of the core 210 is set slightly higher than the refractive index of the cladding 220. According to the second manufacturing method of the second embodiment, in the ultraviolet irradiation step, in irradiating the area 202 on the output end 252 side with ultraviolet light, ultraviolet irradiation may be stopped at a timing where the refractive index of the cladding 220 becomes slightly higher than the refractive index of the core 210.

Further, in the first and second embodiments, the glass rods 100 and 200 are directly fused to the output end 35 of the amplifier optical fiber 30; however, the present invention is not limited thereto. For example, a double-clad fiber or a single-mode fiber with no rare earth element doped therein may be provided between the amplifier optical fiber 30 and the glass rods 100 and 200, and such a double-clad fiber or single-mode fiber may be fused to the glass rod.

Moreover, in the first and second embodiments, the glass rods 100 and 200 are not covered with a specific material. However, the glass rods 100 and 200 may be covered with a second cladding that has a higher refractive index than the claddings 120 and 220. Thus, in the case where a portion of laser light reflects at the output ends 152 and 252, scattering is prevented by the laser light that reflects at the output ends 152 and 252 entering from a side surface into the second cladding.

EXAMPLES

The present invention is described more specifically by way of Example and Comparative Example. It is however to be noted that the present invention is not limited by these examples.

Example 1

First prepared was a glass rod that includes a core of a 30 μm in diameter of quartz doped with $GeO_2$ by 3.5% by mass and a cladding of a 400 μm in outer diameter of quartz doped with $Al_2O_3$ by 2.5% by mass, and that has a length of 1.8 mm. At this stage, the core and the cladding had approximately the same refractive indices.

Then, ultraviolet light was applied to a side surface of the glass rod. The intensity of ultraviolet light at this time was set to 2 $mJ/mm^2$. The glass rod was irradiated with ultraviolet light for 6000 seconds on the input end side, and from the input end side toward the output end side, time period for ultraviolet irradiation was shortened, and in the area distant by 0.1 mm from the input end to the output end side, ultraviolet irradiation was not performed. In this manner, the refractive index of the core was set to 1.454 and the refractive index of the cladding was set to 1.452 at the input end, and difference in refractive index is decreased between the core and the cladding toward the output end, until difference in refractive index no longer exists between the core and the cladding at the output end side.

Also prepared was an optical fiber with a numerical aperture (NA) of 0.10 that has a core of 30 μm in diameter and a cladding of 400 μm in diameter. The optical fiber was processed so as to have an output endface thereof perpendicular to or at an angle of 2 degrees relative to the axial direction of the optical fiber.

Next, the input end of the glass rod was fused onto the output endface of the optical fiber, such that the core of the optical fiber and the core of the glass rod were spliced to each other.

Comparative Example 1

Prepared were a glass rod and an optical fiber that are similar to those of Example 1 except that the core is not formed and the refractive indices are uniform therethrough.

Then, the optical fiber was fused to the glass rod, such that the center in the output endface of the optical fiber is positioned at the center of the input end of the glass rod.

Subsequently, laser light with a wavelength of 1064 nm was input to the optical fibers of Example 1 and Comparative Example 1, and the beam shapes were observed from a place distant by 0.15 m from the output ends of the glass rods by using a CCD camera.

Figure 9:
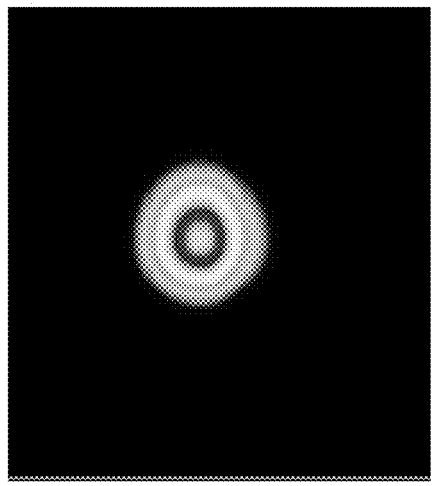
FIG. 9 is a photograph of a beam shape of Example 1.
Figure 10:
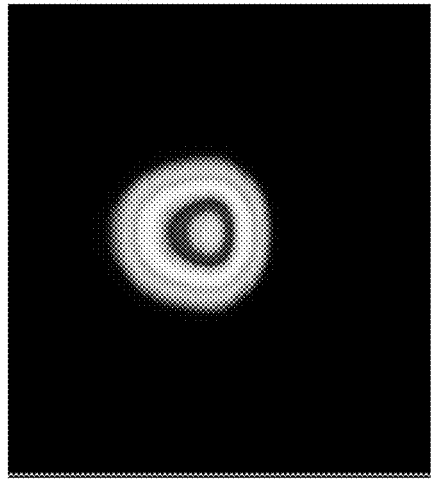
FIG. 10 is a photograph of a beam shape of Comparative Example 1.

FIG. 9 is a photograph of the beam shape of Example 1. FIG. 10 is a photograph of the beam shape of Comparative Example 1. As can be seen in FIG. 9, in Example 1, the beam shape was perfect circle, which is a desired beam shape. Meanwhile, the beam shape was distorted as can be seen in FIG. 10 in Comparative Example 1.

From these results, it has become clear that a desired beam shape is obtainable with a fiber laser apparatus using a glass rod serving as a laser light emitting device of the present invention.

Industrial Applicability

According to the present invention, provided are a laser light emitting device that enables achievement of a fiber laser apparatus capable of outputting laser light in a desired output shape, a method of manufacturing the device, and a fiber laser apparatus using the device.

| Description of Reference Numerals | |
|---|---|
| 1 | fiber laser apparatus |
| 2 | masking |
| 10 | seed laser light source |
| 20 | excitation light source |
| 25 | multimode fiber |
| 30 | amplifier optical fiber |
| 35 | output end |
| 40 | light combiner |
| 100 | glass rod |
| 110 | core |
| 120 | cladding |
| 151 | input end |
| 152 | output end |
| 200 | glass rod |
| 210 | core |
| 220 | cladding |
| 251 | input end |
| 252 | output end |

The invention claimed is:

1. A laser light emitting device, comprising:
a glass rod including an input end and an output end, the glass rod having a core provided along a central axis thereof and a cladding covering the core, wherein
the core and the cladding are adapted such that the core has a higher refractive index than the cladding on the side of the input end, and that
a value given through subtraction of the refractive index of the cladding from the refractive index of the core on the side of the output end is smaller than a value given through subtraction of the refractive index of the cladding from the refractive index of the core on the side of the input end, and wherein
the laser light emitting device includes an area in which the core has a gradually lowering refractive index with respect to the refractive index of the cladding from the input end side toward the output end side.

2. The laser light emitting device according to claim 1, wherein
the refractive index of the core on the output end side is adapted to be equal to or lower than the refractive index of the cladding.

3. The laser light emitting device according to claim 1, wherein
the area in which the core has a gradually lowering refractive index is adapted to be longer than the wavelength of laser light to be input.

4. A fiber laser apparatus, comprising:
an optical fiber that has a core and is configured to output laser light; and
the laser light emitting device of any one of claims 1, 2 and 3, the laser light emitting device having a larger diameter than the core of the optical fiber, wherein
the output end for the laser light of the optical fiber is fused to the input end of the laser light emitting device in such a manner that the core of the optical fiber and the core of the laser light emitting device are spliced to each other.

5. A method of manufacturing a laser light emitting device, comprising:
a preparation step of preparing a glass rod having an input end and an output end, a core, and a cladding covering the core, the core being doped with a dopant that has an action to cause the refractive index thereof to be higher than the refractive index of the cladding upon ultraviolet irradiation; and
an ultraviolet irradiation step of applying a larger amount of ultraviolet light to the input end side than to the output end side, in such a manner that the refractive index of the core is set higher than the refractive index of the cladding at least on the input end side of the glass rod and that the laser light emitting device includes an area in which the core has a gradually lowering refractive index with respect to the refractive index of the cladding from the input end side toward the output end side.

6. The method of manufacturing a laser light emitting device according to claim 5, wherein, in the glass rod to be prepared in the preparation step, the core has a refractive index equal to or lower than the refractive index of the cladding.

7. The method of manufacturing a laser light emitting device according to claim 6, wherein
in the ultraviolet irradiation step, ultraviolet irradiation is adjusted such that the refractive index of the core on the output end side of the glass rod is kept from being higher than the refractive index of the cladding.

8. The method of manufacturing a laser light emitting device according to claim 7, wherein
in the ultraviolet irradiation step, ultraviolet irradiation is not performed on the output end side of the glass rod.

9. A method of manufacturing a laser light emitting device, comprising:
a preparation step of preparing a glass rod having an input end and an output end, a core, and a cladding covering the core, the core having a higher refractive index than the cladding, the cladding being doped with a dopant that has an action to cause the refractive index thereof to be higher than the refractive index of the core upon ultraviolet irradiation; and
an ultraviolet irradiation step of applying a larger amount of ultraviolet light to the output end side than to the input end side, within a range in which the refractive index of the core on the input end side remains higher than the refractive index of the cladding, and in such a manner that the laser light emitting device includes an area in which the core has a gradually lowering refractive index with respect to the refractive index of the cladding from the input end side toward the output end side.

10. The method of manufacturing a laser light emitting device according to claim 9, wherein
in the ultraviolet irradiation step, ultraviolet irradiation is continued until the refractive index of the cladding on the output end side of the glass rod becomes equal to or higher than the refractive index of the core.

11. The method of manufacturing a laser light emitting device according to claim 9 or 10, wherein
in the ultraviolet irradiation step, ultraviolet irradiation is not performed on the input end side of the glass rod.

* * * * *